United States Patent [19]
Sillers, Jr.

[11] 4,298,474
[45] Nov. 3, 1981

[54] MULTIPLE FILTER VESSEL

[75] Inventor: Donald A. Sillers, Jr., Dallas, Tex.

[73] Assignee: Peerless Manufacturing Company, Dallas, Tex.

[21] Appl. No.: 103,857

[22] Filed: Dec. 14, 1979

[51] Int. Cl.³ .............................................. B01D 46/00
[52] U.S. Cl. ..................... 210/238; 55/350; 55/481; 55/484; 55/498; 210/323.2; 210/497.01; 210/232; 55/357
[58] Field of Search ................. 55/350, 484, 357, 481, 55/502, 341, 323, 324, 498; 210/323.2, 232–234, 314–317, 497, 238, 497.01; 211/60 R

[56] References Cited

U.S. PATENT DOCUMENTS

| | | | |
|---|---|---|---|
| 2,010,445 | 8/1935 | Sparks | 210/497 |
| 2,149,589 | 3/1939 | Duaei | 211/60 R |
| 2,767,851 | 10/1956 | Muller | 210/323 T |
| 3,186,551 | 6/1965 | Dornauf | 210/315 |
| 3,285,420 | 11/1966 | Muller | 210/315 |
| 3,319,793 | 5/1967 | Miller, Jr. et al. | 210/323 T |
| 3,349,547 | 10/1967 | Hoipkemeier | 55/324 |
| 3,646,730 | 3/1972 | Reid | 55/350 |
| 3,888,644 | 6/1975 | Holland et al. | 55/324 |
| 4,052,317 | 10/1977 | Palnik | 210/323 T |
| 4,074,985 | 2/1978 | Willas | 55/502 |

FOREIGN PATENT DOCUMENTS

| | | | |
|---|---|---|---|
| 1910521 | 9/1970 | Fed. Rep. of Germany | 55/341 R |
| 893649 | 2/1944 | France | 55/350 |
| 678200 | 12/1964 | Italy | 210/497.1 |
| 323141 | 2/1972 | U.S.S.R. | 55/324 |

OTHER PUBLICATIONS

Gas Filler (Peco) Perry Equipment Corp., Mineral Wells Texas, Bulletin 5, 4/66, pp. 1–4.

*Primary Examiner*—Bernard Nozick
*Attorney, Agent, or Firm*—Richards, Harris & Medlock

[57] ABSTRACT

An elongated tubular natural gas filtering vessel (12) has a plurality of longitudinal tubular filter elements (28) mounted therein by mounting means (44,68,70) which enables lateral displacement of filter elements (28) for longitudinal removal through a forward access port (18) of reduced diameter. A mast structure (44) mounts the filter elements (28) in a matrix array, including perimeteral filter elements (28) not aligned with the access port (18). A central mast (46) is rigidly mounted to the vessel (12) interior, and has a plurality of cross-bars (50) supported thereon. Each cross-bar (50) supports one row in the matrix array. The mast (46) has a plurality of forwardly extending ledges (48) between which are mounted a plurality of latching wrenches (60) with eccentric camming surfaces (64) for releasably locking in place a row of filter elements (28). A super-structure (68,70) is mounted to the mast structure (44) for securing the cross-bars (50) against lateral movement relative to one another. One or more aligned filter elements (28) is longitudinally forwardly removed through the access port (18) followed by lateral displacement of non-aligned filter elements (28) and then removal of the latter through the access port (18). A significant cost reduction in the removable closure head (32) for the access port (18) is realized. Furthermore, servicing time and manpower for removal and replacement of filter elements (28) is drastically reduced.

41 Claims, 11 Drawing Figures

FIG. 11

MULTIPLE FILTER VESSEL

TECHNICAL FIELD

The invention relates to filters and filter/separators used, for example, in the removal of liquids and/or solids from a stream of natural gas.

BACKGROUND ART

Separators used to remove liquids and solids from gas streams typically comprise an elongated tubular vessel having a plurality of smaller and shorter tubular filter elements longitudinally disposed at one end of the vessel. This end of the vessel is closed by a removable head of typically the same diameter as the vessel to permit access to the filter elements so they may be removed and replaced from time to time as they become clogged with liquids and solids removed from the gas stream as it passes through the filters. The filter elements have closed forward ends adjacent the removable head and open rearward ends which communicate with flow path directive members and various chambers and ultimately with a discharge port. An inlet port admits the gas to be filtered which then may be directed through an inlet separation chamber or a tortuous flow path and ultimately to the outer surfaces of the filter elements. The gas then permeates the filter elements and flows through the rearward open ends to the discharge port.

The rearward open ends of the filter elements are usually mounted to respective fittings which have extending forwardly therefrom a spine or shank which extends centrally through the respective filter element to the forward end thereof. The forward end of the filter element is normally sealed by a cap which is mounted to the forward end of the shank. In one type of separator vessel, the filter elements are not supported upon a spine or shank, but are held in position by a rectangular matrix of bars which supports the forward ends which are secured by bolts and nuts to the bars. In servicing the vessel, the removable head is unscrewed and removed from the end of the vessel. Each filter element is then loosened at the forward end of the shank or at a supporting matrix and slid longitudinally forwardly through the end of the vessel.

Removal of the head is a difficult and time consuming task because of its size and weight. In commercial size units, the head may typically weigh several thousand pounds. Auxiliary closure hinges or davits are therefore required to aid in removal of the head. Further, the manufacture of such large heads (often 5 feet in diameter) is a very expensive step in the manufacturing process, and adds significant cost to the unit.

In present separator vessels, removal of the filter elements usually requires that the caps on the forward ends of each filter element be removed from the central shank extending through the filters, which is commonly done by unscrewing a nut from a threaded stud on the forward end of the shank. Upon installing the new filters, all of the forward ends thereof must be secured in the mounted position. Upon replacing the head on the end of the vessel, great care must be exercised to ensure a tight sealed fit, which is difficult and cumbersome. In the larger type vessels, a servicing operation typically requires a full work day.

Of considerable significance also are the changes involved in replacing filters which in large filter vessels require that a workman enter the vessel to remove and replace the filter elements. The liquids present in natural gas are usually flammable hydrocarbons which, if ignited by a spark, can seriously injure or kill the workman.

SUMMARY OF THE INVENTION

The present invention significantly reduces the cost of a separator vessel by permitting the use of a smaller than conventional removable head on the end of the vessel which provides the access opening. Notwithstanding the use of a smaller head, the filter elements can conveniently be removed through the end of the vessel. Furthermore, the invention substantially reduces the danger involved in removal and replacement of the filter elements because the workman performing the tasks need not enter the vessel. Removal and replacement can be done by reaching into the vessel. The body of the workman can remain outside the vessel during the operation.

The invention includes special mounting means which enable lateral displacement of filter elements which are non-aligned with the access opening to a position of alignment, whereby to permit removal and replacement thereof through a smaller than usual access opening. The mounting means include a mast structure disposed in the vessel and positioned against the forward closed ends of the filter elements in a matrix array. The mounting means has one or more intermediate partially assembled conditions to permit initial removal of filter elements aligned with the access port followed by lateral displacement of non-aligned filter elements to vacated areas to permit removal thereof through the access port. Assembly and disassembly of the mounting means is fast and efficient, and substantially reduces the requisite servicing time for removing and replacing the filter elements.

A unique filter tip is provided on the filter elements which permits their mounting within the vessel without the use of bolts and nuts which materially decreases the time required to remove and replace the filter and the number of parts with which a workman must contend.

In the preferred embodiment, the mast structure comprises a mast rigidly mounted to the interior of the vessel body and a plurality of cross-bars supported on the mast. Each cross-bar supports the forward end of a plurality of filter elements. The cross-bars have varying lengths and each supports one row of the matrix array.

The forward ends of the filter elements have forwardly extending studs rigidly mounted thereto and the cross-bars have apertures for receiving the studs. Compression springs are mounted to the rear sides of the cross-bars around the apertures to both guide the studs into the apertures and to bias the filter elements rearwardly in assembled condition. The vessel body has a plurality of annular reception fittings receiving the rearward open ends of the filter elements in biased sealing relation. The springs further compensate for tolerance deviations and moment arms along the cross-bars.

The mast may also have a plurality of forwardly extending ledges rigidly secured thereto. Each ledge has a notch with a generally C-shaped configuration having a first leg extending laterally into the ledge and a second leg extending longitudinally forwardly therefrom. Latching wrench means, including a shaft and an eccentric camming surface, are disposed between adjacent ledges and mounted in the notches. A handle is provided for rotating the shaft to a slightly over-center position relative to the eccentric camming surface bearing rearwardly against a respective cross-bar. The handle is stopped against a forward end of a filter element to provide a locked over-center position.

An installation tool is temporarily mounted on a respective ledge for temporarily holding some of the filter elements as an aid in the installation sequence. The tool has a pair of arms extending rearwardly from a central section mounted to the ledge and then oppositely laterally to underlie a row of filter elements. Auxiliary positioning fingers may be mounted to the interior side wall of the vessel and extend generally laterally toward one end of the mast to aid in positioning a short row. A plurality of shoulder members of varying lengths extend laterally across the interior of the vessel underlying the annular reception fittings, which shoulder members guide and support the rearward open ends of the filter element into sealing engagement with the annular reception fittings during installation.

A superstructure is mounted to the mast structure and includes a pair of interconnector bars spaced on opposite sides of and generally parallel to the mast and extending across and in front of the cross-bars, and a clamping bar extending across the interconnector bars and removably mounted to the mast. This superstructure rigidly secures the cross-bars against lateral movement relative to one another. The cross-bars, latching wrenches, interconnector bars, and clamping bar are removable through the access port.

DETAILED DESCRIPTION

Figure 1:
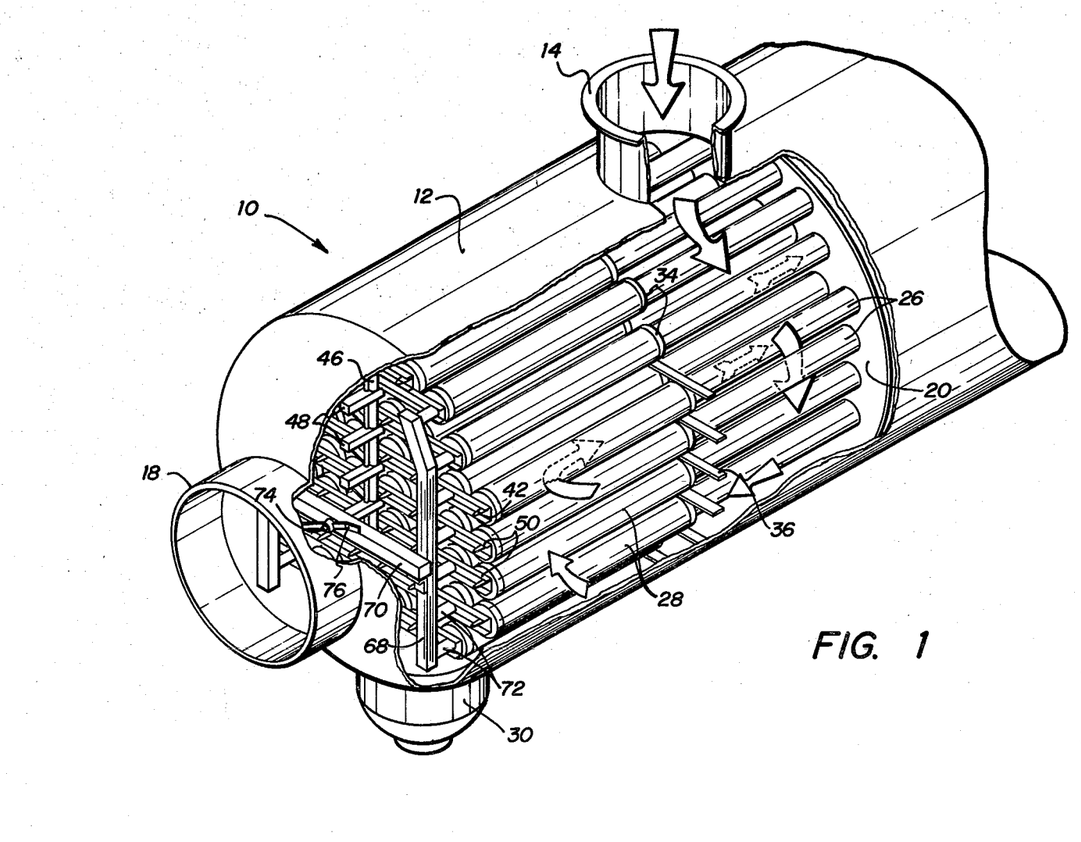
FIG. 1 is an isometric view, partially cut away, of a section of a filter vessel constructed in accordance with the invention.
Figure 2:
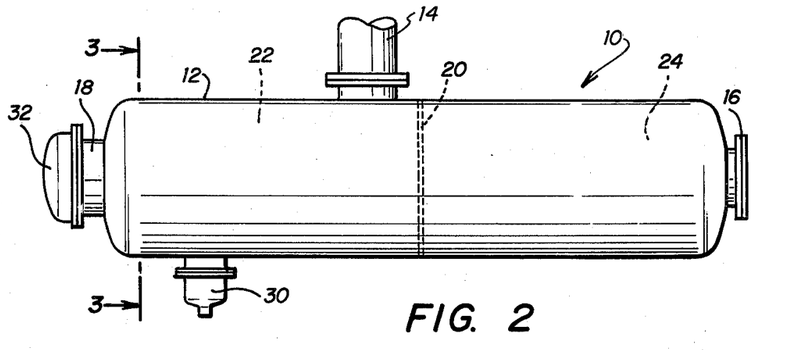
FIG. 2 is a side elevation view of a vessel constructed in accordance with the invention.

Referring to FIGS. 1 and 2, there is shown a filter vessel 10 comprising an elongated hollow tubular vessel body 12, an inlet port 14, an outlet port 16, and an access port 18. The lateral dimension or diameter of access port 18 in the illustrated embodiment is about one-half of the lateral dimension or diameter of vessel body 12.

Mounted within the vessel body is a bulkhead or partition 20 dividing the interior of the vessel into a forward compartment 22 and a rearward compartment 24. Bulkhead 20 is a disc-like member sealed around its periphery to the interior side wall of the vessel. The bulkhead has a plurality of apertures formed therethrough from which extend forwardly a plurality of rigid tubular flow path members 26. A plurality of elongated hollow tubular filter elements 28 have open rearward ends sealed to the forward ends of members 26. The filter elements have closed forward ends mounted by a mast structure, to be more fully described hereinafter. As the gas enters inlet port 14, it strikes the exterior shell surfaces of members 26. The gas will assume a generally forwardly directed flow around the perimeter of the interior side wall of the vessel body and will enter the filter elements 28, permeating therethrough to the hollow interior thereof and then pass rearwardly therethrough and through hollow tubular flow path members 26 and bulkhead 20 apertures into rear compartment 24, which may contain mist extractors, etc. as is well known in the art. The gas is then discharged through outlet port 16 in a filtered condition. The gas will often have entrained solids, such as sand particles, which enter forward compartment 22 and are carried by the gas to a space near access port 18 on the bottom of the vessel. A lower collection sump 30 is provided to trap the solid particles and thus minimize build-up of solids in the main chamber of vessel 10.

Removable head 32 is threadedly secured to access port 18. Head 32 is relatively small, light and in many instances, depending upon size, can be easily handled by a single workman. This reduced head is significantly less costly to manufacture than a head having the same diameter as vessel body 12.

Figure 3:
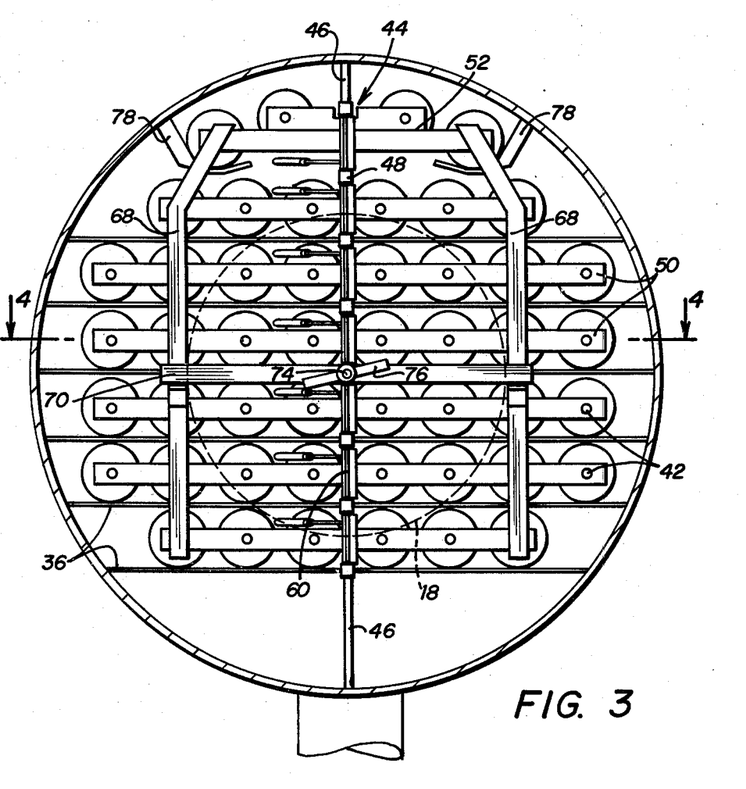
FIG. 3 is a cross-sectional view taken along line 3—3 of FIG. 2.
Figure 5:
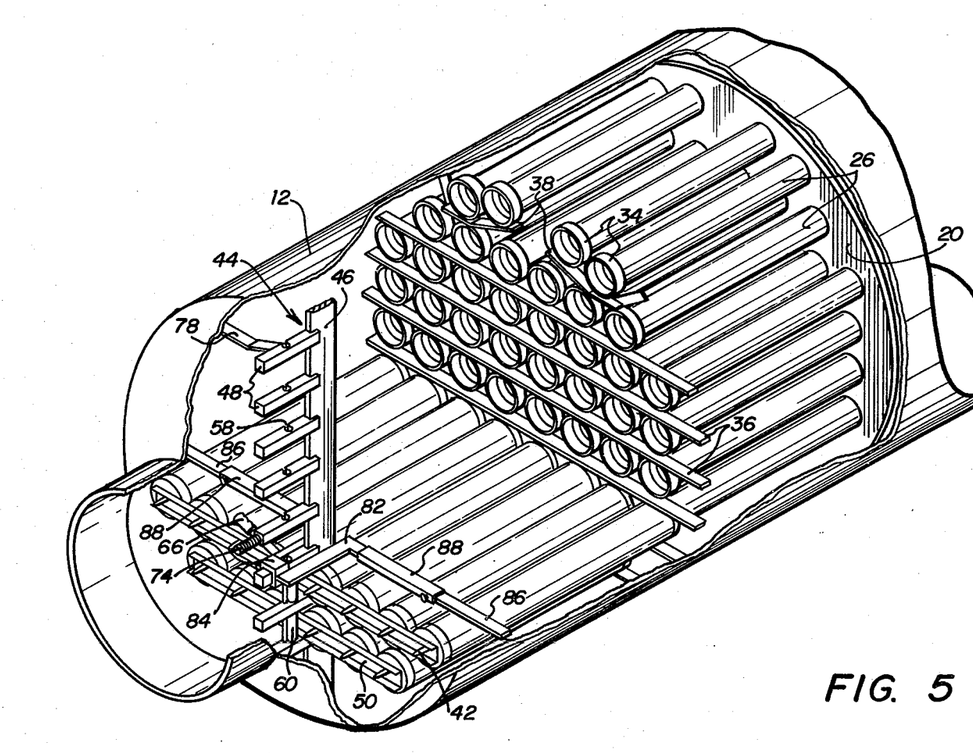
FIG. 5 is a view similar to FIG. 1 but showing a partially assembled condition.

Flow path members 26 are rigidly secured, such as by welding, at their rearward ends to bulkhead 20, and have enlarged circular flanges at their forward ends to form annular reception fittings 34 for the filter elements, FIG. 5. Extending laterally across the vessel body interior are a plurality of shoulders 36 mounted at their ends to the interior side wall of the vessel body. Each shoulder extends beneath one row of reception fittings 34 in the matrix array formed by the latter. These shoulders are preferably rigidly secured to the undersides of the reception fittings and/or members 26, such as by welding, and provide additional support therefor in addition to the rigid securement to the bulkhead 20 at the rear ends of members 26. Due to the arcuate periphery of the interior side wall of vessel body 12, and the varying number of members in a row, it may be desirable to provide a pair of positioning fingers 38, FIG. 5, mounted to the vessel body interior side wall near the top thereof and extending generally laterally towards the middle in lieu of a shoulder 36. As shown in FIG. 3, it is desirable to provide a large space 47 in the bottom of the vessel 10 to provide a space within which the velocity of the gas will decrease, thereby inducing entrained solids to be deposited by the gas stream.

Figure 4:
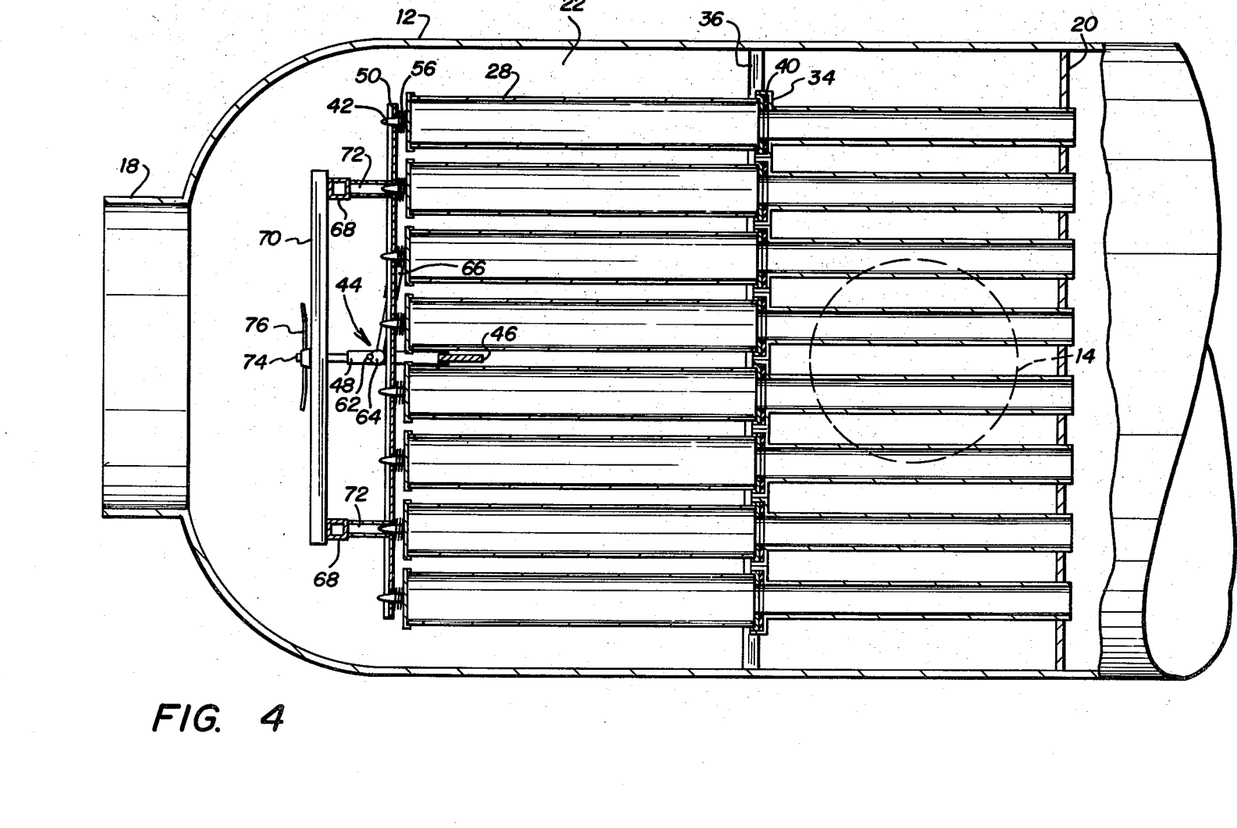
FIG. 4 is a cross-sectional view taken along line 4—4 of FIG. 3.

Each filter element 28 is an elongated hollow annular tubular member having a closed or capped forward end and an open rearward end with an annular gasket 40, FIG. 4, for sealing engagement with reception fitting 34. Each forward closed end of the filter elements has a pointed stud 42 extending forwardly from the center thereof.

Figures 6, 7, 8, 9:
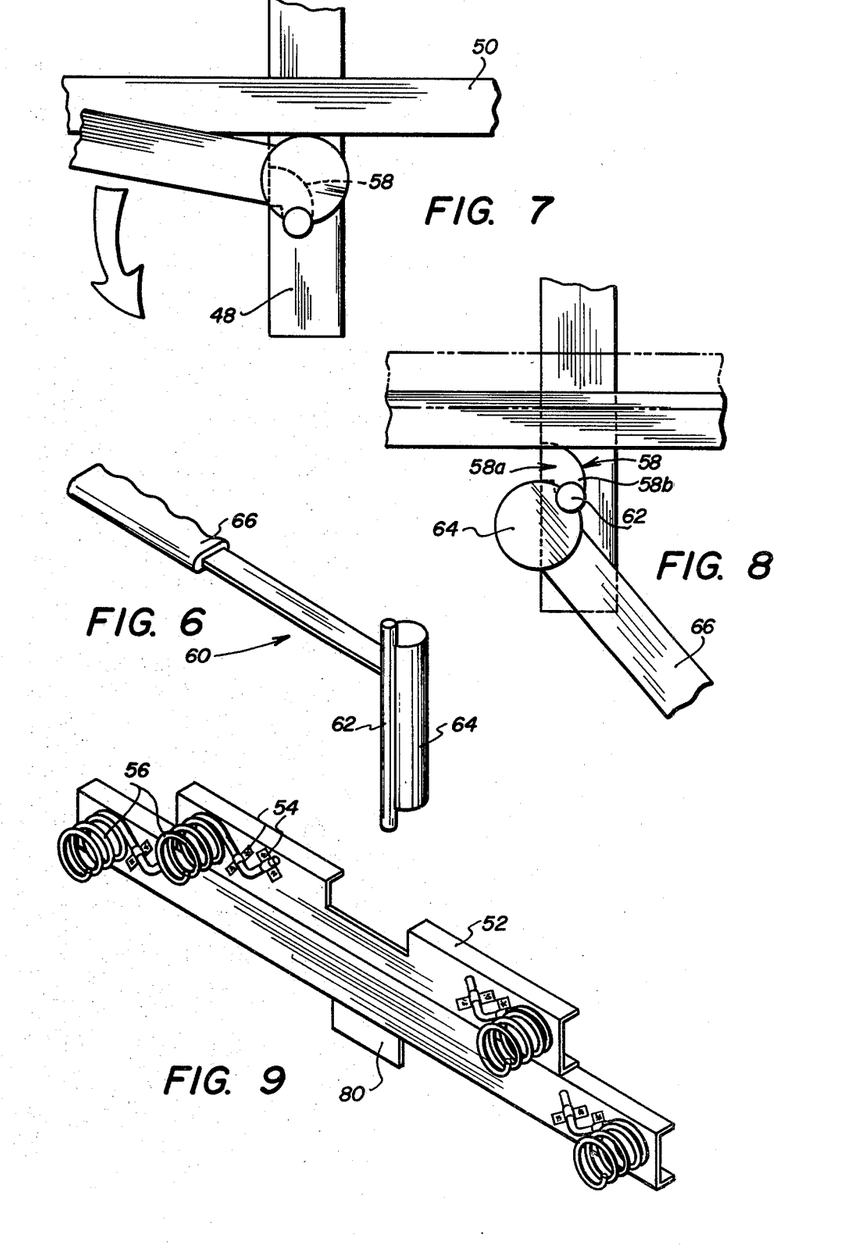
FIG. 6 is an isolated isometric view of the latching wrench of the present invention.
FIG. 7 is an isolated partial top view of the wrench in locked position.
FIG. 8 is a view similar to FIG. 7 but showing the wrench in an unlocked position.
FIG. 9 is an isolated isometric view of a particular cross-bar of the present invention.

Mounted in the forward end of the vessel body proximate access opening 18 is a mast structure generally designated by the reference character 44, FIGS. 5, 4 and 3. A central upright mast 46 extends vertically across and along a diameter of the vessel body. Mast 46 is rigidly mounted at its upper and lower ends to the interior side wall of the vessel body. This mast has a plurality of spaced ledges 48 extending forwardly therefrom, as shown in FIG. 5. Each ledge supports a cross-bar 50 which is a channel-like member extending laterally across the interior of the vessel body perpendicular to mast 46. Each cross-bar supports one row of filter elements in the matrix array, FIG. 3. The top cross-bar, FIG. 3, is a double cross-bar 52 which supports the two top rows. FIG. 9 shows an isolated view from the rear of this double cross-bar 52.

Each cross-bar has a plurality of spaced apertures formed therethrough for receiving respective studs 42 of the closed front ends of the filter elements 28. Mounted on the back side of the cross-bars, for example by weldments 54, FIG. 9, around each aperture are cylindrical compression springs 56. During installation, these compression springs serve to guide the stud into the aperture to aid in the positioning of the filter element row. In assembled condition of the mast structure, these springs also provide a rearwardly directed biasing force against the filter elements to seal gasket 40 (see FIG. 4) against annular reception fitting 34.

Each ledge 48 has an arcuate slot or notch 58 formed therethrough having an opening 58a extending laterally into the ledge and forming a seat 58b, FIGS. 7 and 8. Between and engaging adjacent ledges is a latching wrench 60, shown in FIG. 6. This wrench has a shaft 62 with upper and lower ends which are slid laterally into openings 58a, FIGS. 7 and 8. This shaft has an eccentric camming surface 64 and a handle 66. FIG. 8 shows the wrench 60 in an unlatched condition with shaft 62 in the seat 58b, and handle 66 pivoted counterclockwise with camming surface 64 generally facing forwardly.

Upon clockwise pivoting of handle 66 to the position shown in FIG. 7, camming surfce 64 engages cross-bar 50 to force the latter rearwardly against the bias of and compressing springs 56. The wrench is pivoted clockwise until handle 66 is stopped, for example, when it engages one of the filter element forward ends, FIG. 5. This arrests the location of shaft 62 in a slightly over-center position relative to eccentric camming surface 64 such that springs 56 tend to urge further clockwise rotation of the wrench, and thus retain the wrench in the position shown in FIG. 7. To release the wrench, handle 66 is pulled in the direction shown by the arrow in FIG. 7 which initially slightly compresses springs 56 even further as camming surface 64 passes through over-center and then allows expansion of springs 56 as cross-bar 50 moves forwardly (downwardly in FIG. 7) as the camming surface height decreases.

If a double cross-bar 52 is used for the top row as in FIG. 3, then it may be desirable to lower the position of handle 66 on shaft 62 for the wrench supporting that top row in order to provide the appropriate stop for handle 66.

FIGS. 1, 3 and 4 show the mast structure in assembled condition. In addition to this mast structure, the mounting means of the present invention further comprises a superstructure including a pair of interconnector bars 68 and a clamping bar 70. As seen in FIG. 3, interconnector bars 68 are spaced on opposite sides of and are parallel to mast 46, and extend laterally across cross-bars 50. On the rear sides of these interconnector bars are a plurality of sleeves 72, FIGS. 1 and 4, which are inserted around designated studs 42 of the filter element front ends. One of the ledges 48 has a threaded bolt 74 on the front end thereof, FIG. 5, for mounting clamping bar 70, for example, by means of large wing nut 76. Clamping bar 70 extends between and overlies at its ends the interconnector bars 68 to hold them in a rearwardly locked condition, and to prevent movement of cross-bars 50 relative to one another.

There may be included positioning fingers 78, FIG. 3, comparable to previously mentioned positioning fingers 38, FIG. 5, for positioning a pair of filter element front ends in the top row. These positioning fingers 78 aid in the installation sequence by providing temporary supports, as will be described more fully hereinafter. Furthermore, these positioning fingers 78 add further rigidity to the assembled mounting means, including the mast structure and superstructure, by enhancing resistance to up-down movement, from the FIG. 3 perspective.

In servicing the vessel for filter replacement, the superstructure is first disassembled by removing wing nut 76, clamping bar 70 and interconnector bars 68. Each of these elements is removed through access port 18. Next, one of the wrenches latching a row having filter elements is released and removed from notches 58 and out through access port 18. Then, the cross-bar 50 for that row is removed through the access port 18. As seen in FIG. 4, there is sufficient room in the space between the forward ends of the filter elements and the interior edges of access port 18 to permit removal of cross-bars 50 and interconnector bars 68 by oblique canting and pivoting of one end at a vessel interior side wall and swinging the other end past the interior lip edge of access port 18. Aligned filter elements are then removed longitudinally forwardly through access port 18, followed by lateral displacement of non-aligned filter elements into vacated spots in that row which are aligned with access port 18 to permit removal thereof.

For example, referring to FIG. 3, and identifying the rows as 1–7 as indicated therein, the preferred sequence for removal of the filter elements is in the following sequence, 2, 1, 3, 4, 5, 6, 7.

The mast structure 44 and forward tips of the filter elements 28 are positioned close enough to the access port 18 that they can be reached by the hands of a workman standing near the access port 18 who extends his arms through the access port 18. Thus, it is not necessary for a workman to enter the vessel to replace filter elements, significantly reducing the danger of the operation.

In the preferred form of the invention, the cross-bars 50 are color coded to indicate the desired sequence of removal. For example, the colors of a particular country's flag in which the vessel is used would provide an easy to follow color coding. In the embodiment of FIG. 3, the cross-bar for row 2 is red, the cross-bars for rows 1, 3, 4, 5, and 6 are white, and the cross-bar for row 7 (also seen in FIG. 9) is blue. Adherence to this sequence of red-white-blue by workmen will ensure proper removal of the filter elements, and adherence to the reverse sequence will ensure properly installed replacement filter elements.

Of course, it is not necessary to follow exactly the recommended sequence and the sequence of removal can be changed by the dimension of the filters and filter vessel.

Disassembly of the mounting means and removal of the filter elements is fast and efficient. A simple pivotal movement of a latching wrench releases an entire row of filter elements which are then quickly and easily removed through the access port.

Installation of row 7 is facilitated in an expeditious manner by the use of an installation tool 82, FIG. 5. This tool has a central sleeve 84, which fits around ledge 48, and a pair of lateral arms 86 which extend rearwardly from central sleeve 84 on opposite sides of ledge 48 and then laterally outwardly towards the side walls of the vessel body. These rearwardly recessed lateral arms 86 may have telescoping attachments 88 to permit varying of the length thereof and hence use of the same installation tool for more than one row. While the tool is needed only for row 7, it can be used for rows thereabove, as illustrated in FIG. 5. However, it is not needed on row 6, for example, because the filter elements of row 7 will assist in the positioning of filter elements to be installed in row 6, and those in row 6 will support those being installed in row 5, et cetera.

In installing a row, installation tool 82 is inserted through access port 18 and mounted to the appropriate ledge 48. The filter elements for that row are then inserted through access port 18 and canted upwardly or downwardly until their rear ends swing in front of and above lateral arms 86 and then are slid rearwardly with the front ends of the filter elements raised as permitted during rearward sliding of the filter elements. The rearward open ends of the filter elements are rested on shoulder 36 in alignment with respective annular reception fittings 34. The lateral arms 86 engage the underside of the main body of the filter elements to temporarily hold the filter elements in position. The cross-bar 50 for that row is then inserted through access port 18 and supported on ledge 48 with its lower tab 80, FIG. 9. This cross-bar is positioned on the ledge 48 such that its tab 80 is rearward of central sleeve 84 of the installation tool, FIG. 5. The studs 42 of the filter elements are then guided into the apertures in the cross-bar and the latching wrench 60 may be inserted and turned to its latched condition to thus secure that row in place. The installation tool 82 is then removed forwardly off ledge 48. The remaining rows are installed in a comparable manner, using shoulders 36 and installation tool 82 as temporary holding mounting means for the filter elements.

To install row 1, the two outermost filter elements are inserted through access port 18 and canted upwardly until their rearward open ends rest on positioning fingers 38, FIG. 5, in alignment with respective annular reception fittings 34. The forward closed ends of these two outer filter elements are then swung inwardly towards mast 46 and then upwardly over and around to rest on positioning fingers 78, FIGS. 3 and 5. The middle two filter elements of this top row 1 are then inserted through access port 18 and canted upwardly until their rearward open ends rest on positioning fingers 38 and their forward ends may be held with one hand by the workman or may be held by an installation tool. Double cross-bar 52, FIG. 9, is then inserted through access port 18 and positioned on the respective ledge 48 with lower tab 80, FIG. 9, engaging the top of the ledge between mast 46 and notch 58, FIG. 5. Springs 56 aid in guiding studs 42 through the apertures in the cross-bar. Wrench 60 is then inserted through access port 18 and shaft 62 is inserted in notches 58 between adjacent ledges 48 and turned counterclockwise to a latched position to thus complete installation of row 1.

Various modifications can be made in the illustrated embodiment without departing from the scope of the invention. For example, as a substitute for installation tool 82, which is supported on ledge 48 and removable, there could be employed a pair of arms which are pivotally attached to mast 46 and extend rearwardly therefrom in a collapsed position when not in use. In use, the arms, which are preferably positioned to support the filter elements in row 7, are pivoted forwardly to form a shelf extending across the vessel near the opening of the vessel to support the forward end of the elements in row 7 as they are installed. For rows 6-2 a telescoping bar may be inserted into the vessel to rest upon the front end of the last row installed to support the next row thereabove during installation. This bar could be provided with arcuate recesses to assist in lateral positioning of the filter element, if desired. The shelves which support the filter elements can be temporary or permanent and affixed to the vessel or mast at any convenient location.

The shelves which assist in installation may even be dispensed with if the fittings 34 are made sufficiently long to support the filter elements thereon without assistance from a forward shelf. This embodiment is not preferred because the longer fittings will block some gas flow through the filter, even if the fittings are perforated.

Figure 10:
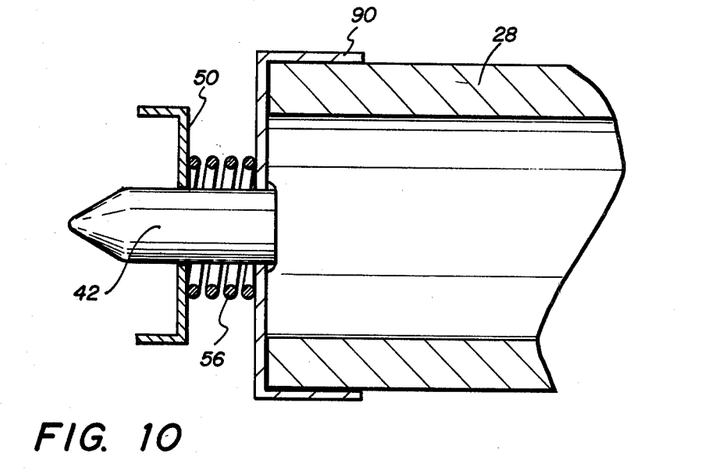
FIG. 10 is a partial elevational view of the preferred form of a filter element tip.
Figure 11:
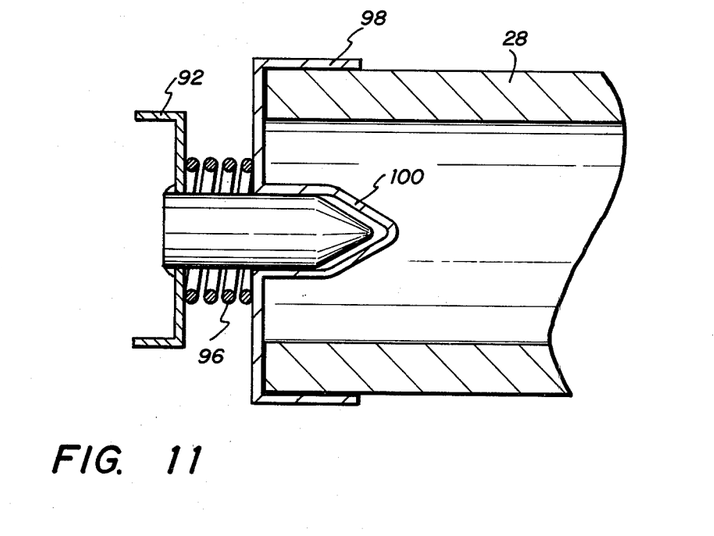
FIG. 11 is another form of a filter element tip.

Various forms of tips for the filter tubes may also be employed. Reference is made to FIGS. 10-12. FIG. 10 illustrates the filter tip of the embodiment illustrated in FIGS. 1-9. In this embodiment, the tip comprises a cylindrical cup 90 extending from the bottom of which is the stud 42. Stud 42 is adapted to be received through spring 56 which is affixed to one of the cross-bars 50 or cross-bar 52. The spring serves to compress the filter element 28 when the cross-bars are compressed with the wrenches 60. The studs 42 also assist in installation and removal of filter elements because they can be grasped to permit manipulation of the filter elements.

Another form of tip is shown in FIG 11. With this form, the stud is attached to and extends from a cross-bar 92 which also has a spring 94 attached thereto. The cap 98 is provided with a recess 100 to receive the stud and permit forward support of the filter element 28.

While preferably the caps 90 and 98 are fixedly attached to filter elements 28, they can be made removable and thus reduce the cost of the replacement filter.

Various other modifications will occur to those skilled in the art after a reading of the foregoing.

It is recognized that various modifications are possible within the scope of the appended claims.

I claim:
1. A filter vessel comprising:
    a longitudinal vessel body having forward and rearward ends;
    an inlet port in said vessel body for admitting fluid to be filtered;
    an outlet port in said vessel body for discharging filtered fluid;
    an access port in said forward end of said vessel which is smaller in diameter than said vessel and large enough to permit passage of the arm of a person therethrough;
    a plurality of horizontally disposed longitudinal elongated filter elements having an enclosing peripheral wall and forward and rearward ends positioned intermediate said inlet and outlet ports for filtering said fluid; and
    mounting means, for mounting said filter elements longitudinally and horizontally within said vessel body proximate said forward end such that one or more of said filter elements is non-aligned with said access port, said mounting means comprising;
    (a) support means for said forward end of said filter elements positions sufficiently close to the access port in the forward end of said vessel to permit placement and removal of the filter elements by a person whose body remains outside the vessel, and, (b) locking means for allowing lateral movement of said filter elements in an unlocked mode and for retaining said filter elemetns in a horizontally disposed position intermediate said inlet and outlet ports in a locked mode.

2. The invention according to claim 1 wherein said filter elements have forward and rearward ends and wherein said forward ends of said filter elements are proximate said forward end of said vessel body and longitudinally spaced therefrom by a distance which is less than the longitudinal length of said filter elements.

3. The invention according to claim 2 comprising a plurality of annular reception fittings mounted within said vessel body rearwardly of said filter elements and communicating with said outlet port, and wherein said filter elements are tubular members closed at said forward ends thereof and open at said rearward ends thereof, said mounting means in said locked mode mounting said filter elements in longitudinal alignment with and said open rearward ends thereof in sealing engagement with respective annular reception fittings.

4. The invention according to claim 3 wherein said tubular filter elements further comprise a cap sealingly attached to and closing said forward ends, said clamp having a pointed stud extending therefrom which can be grasped by human hand to manipulate the filter element to which the cap is attached and also serving to support said forward end of said filter element with the support means of said mounting means.

5. The invention according to claim 3 wherein said vessel body is a tubular member having a circular disc-like bulkhead mounted laterally therein against the interior side wall thereof and defining a forward chamber communicating with said inlet port and said access port and defining a rearward chamber communicating with said discharge port, said bulkhead having a plurality of apertures therethrough from which extend forwardly a plurality of longitudinal tubular flow path members having said annular reception fittings at the forward ends thereof.

6. The invention according to claim 5 comprising a plurality of shoulder members of varying lengths extending laterally across and mounted at their ends to the interior of said vessel body to support the forward ends of said flow path members and to guide and support said rearward ends of said filter elements into said sealing engagement with said annular reception fittings during installation of said filter elements.

7. The invention according to claim 6 wherein said annular reception fittings comprise annularly enlarged flanges on said forward ends of said flow path members.

8. The invention according to claim 3 wherein said mounting means comprises a mast structure mounted within said vessel body and positioning said forward closed ends of said filter elements in a matrix array, said mounting means having one or more intermediate partially assembled conditions to permit initial removal of filter elements aligned with said access port followed by lateral displacement of non-aligned filter elements to vacated areas to permit removal thereof through said access port.

9. The invention according to claim 8 wherein said vessel body is a tubular member and wherein the longitudinal axis of said access port is parallel to the longitudinal axis of said vessel body.

10. The invention according to claim 9 wherein said mast structure comprises a mast rigidly mounted to the interior of said vessel body and a plurality of cross-bars supported on said mast, each said cross-bar supporting a plurality of said forward closed ends of said filter elements.

11. The invention according to claim 4 further comprising a removable installation tool temporarily holding at least some of said filter elements for subsequent positioning by said mast structure.

12. The invention according to claim 11 wherein said vessel body is an annular tubular member, and further comprising one or more positioning fingers mounted to the interior side wall of said vessel for temporarily holding any remaining filter elements, not held by said installation tool, for subsequent positioning by said mast structure.

13. The invention according to claim 12 wherein said mast structure comprises a central mast rigidly mounted to the interior of and extending across a diameter of said vessel body, and a plurality of cross-bars supported on said mast each supporting one row of said matrix array, said positioning fingers being disposed near one end of said mast and extending from said interior vessel side wall generally laterally toward said mast.

14. The invention according to claim 11 wherein said mast structure comprises a mast rigidly mounted to the interior of said vessel body and a plurality of cross-bars supported on said mast, each cross-bar supporting a plurality of said forward closed ends of said filter elements forming one row of said matrix array, and wherein said installation tool temporarily supports one row of said matrix array at a time.

15. The invention according to claim 14 wherein said mast has a plurality of forwardly extending ledges, each supporting one of said cross-bars, said installation tool being temporarily supported on a respective ledge.

16. The invention according to claim 15 wherein said installation tool comprises a central sleeve for insertion onto and around said forwardly extending ledge, and a pair of oppositely extending lateral arms supporting a row of said filter elements.

17. The invention according to claim 16 wherein said lateral arms engage the underside of said filter elements, and wherein said cross-bar is supported on said ledge rearwardly of said central sleeve of said installation tool, and said cross-bar engages said forward closed ends of filter elements, such that said installation tool is first mounted on said ledge with one row of said filter elements resting on said lateral arms, and then said cross-bar is mounted on said ledge rearwardly of said central sleeve and engages said forward closed ends of said one row of said filter elements to support the latter, whereafter said installation tool is removed.

18. The invention according to claim 14 wherein the rows in said matrix array have varying numbers of filter elements therein, and wherein said installation tool has a pair of oppositely extending lateral arms each of variable telescoping length whereby to afford use of the same installation tool for more than one row of said matrix array.

19. The invention according to claim 15 wherein said installation tool has a central section supported on said ledge and a pair of arms extending rearwardly from said central section and then oppositely laterally to underlie a row of filter elements, the rearward recession of said arms enabling oblique canting of said filter elements through said access port if necessary during installation or removal.

20. The invention according to claim 6 wherein said mast structure further comprises latching wrench means mounted to said mast in a latched condition and bearing against said cross-bars to exert a rearwardly directed force thereon.

21. The invention according to claim 20 wherein said mast structure further comprises resiliently comprehensive biasing means bearing between said cross-bars and said forward closed ends of said filter elements to provide biased sealing engagement between said rearward open ends of said filter elements and said annular reception fittings and to compensate tolerance deviations and moment arms along said cross-bars.

22. The invention according to claim 21 wherein each of said forward closed ends of said filter elements has a stud extending forwardly therefrom, and said cross-bars have apertures therethrough for receiving said studs, and wherein said biasing means comprise helical compression springs mounted to said cross-bars rearwardly of and concentric with said apertures to guide said studs through said apertures and facilitate positioning of said filter elements.

23. The invention according to claim 20 wherein said latching wrench means comprises a plurality of shafts each with an eccentric camming surface, and wherein said mast has a plurality of ledges spaced therealong supporting said cross-bars, said ledges having notches formed therein for receiving the ends of a respective said shaft between adjacent said ledges, said shafts being rotatable in said notches to said latched condition with said eccentric camming surfaces bearing against said cross-bars to exert said rearwardly directed force thereon.

24. The invention according to claim 23 wherein said ledges extend longitudinally forwardly from said mast and said cross-bars are supported on said ledges forwardly of said mast and rearwardly of said notches.

25. The invention according to claim 24 wherein said notches are of generally C-shaped configuration having a first leg extending laterally into said ledges and a second leg extending longitudinally forwardly therefrom, and wherein said latching wrench means further comprises a handle for turning said shaft in said notches, said handle also providing a stop to limit rotation of said shaft to a position slightly past over-center relative to said eccentric camming surface such that said shaft is locked in said forward leg of said notch.

26. The invention according to claim 25 wherein said mast structure further comprises resiliently compressive biasing means bearing between said cross-bars and said forward closed ends of said filter elements, said over-center position of said shaft effecting maximum compression of said biasing means as said eccentric camming surface bears said cross-bar to its rearmost position, said biasing means tending to cause rotation of said shaft away from said over-center position whereby said shaft is biased and locked in said forward leg of said notch when said shaft is in said stopped rotational position slightly past over-center.

27. The invention according to claim 10 further comprising a superstructure mounted to said mast structure and comprising cross-bar interconnection means rigidly securing said cross-bars against lateral movement relative to one another.

28. The invention according to claim 27 wherein said superstructure comprises a pair of interconnector bars spaced on opposite sides of and generally parallel to said mast and extending laterally across and in front of said cross-bars, and a clamping bar extending between said interconnector bars and removably mounted to said mast.

29. The invention according to claim 28 wherein said interconnector bars and said clamping bar are removable through said access port.

30. The invention according to claim 28 wherein each of said forward closed ends of said filter elements has a stud extending forwardly therefrom, and said cross-bars have apertures therethrough for receiving said studs, and wherein said interconnector bars engage designated said studs.

31. The invention according to claim 30 wherein said mast has a plurality of ledges spaced therealong extending longitudinally forwardly and supporting said cross-bars, and wherein said clamping bar is rigidly secured to the forward end of one of said ledges.

32. The invention according to claim 20 wherein said cross-bars and said latching wrench means are removable through said access port and can be manipulated by a person whose body remains outside the vessel by extending an arm into the vessel.

33. The invention according to claim 10 wherein said mast extends centrally along a diameter of and laterally across the interior of said vessel and is rigidly mounted at each end to the interior side wall of said vessel, and wherein said cross-bars extend laterally partially across the interior of said vessel and perpendicular to said mast.

34. The invention according to claim 15 wherein said cross-bars have varying lengths, and wherein each said cross-bar supports one row of said matrix array, the rows of said array having variable numbers of filter elements.

35. The invention according to claim 16 wherein said matrix array has a middle row extending substantially entirely across the interior of said vessel with the respective said cross-bar therefor extending therealong, and wherein all said cross-bars are removable through said access port.

36. The invention according to claim 17 wherein said access port has a diameter which is less than three-fourths the diameter of said vessel.

37. A filter vessel comprising:
a longitudinal tubular vessel body having forward and rearward ends;
an inlet port in said vessel body for admitting fluid to be filtered;
an outlet port in said vessel body for discharging filtered fluid;
an annular access port in said forward end having a reduced diameter relative to said vessel body;
a removable head sealing said access port;
a plurality of elongated horizontally disposed tubular hollow filter elements positioned intermediate said inlet and outlet ports for filtering said fluid, said filter elements having closed forward ends longitudinally spaced from said forward end of said vessel body by a distance which is less than the longitudinal length of said filter element;
partition means dividing the interior of said vessel body into a chamber communicating with said inlet port and a chamber communicating with said outlet port, and including a plurality of annular reception fittings communicating between said chambers; and mounting means which in a locked mode mount said filter elements longitudinally within said vessel body proximate said forward end in a matrix array such that one or more of said filter elements in non-aligned with said access port and said open rearward ends of said filter elements in sealing relation with said annular reception fittings, such that fluid entering said inlet port permeates said filter elements and flows rearwardly through said annular reception fittings to said outlet port;

said mounting means comprising support means for said forward ends of said filter elements and locking means for allowing lateral movement of said filter elements in an unlocked mode and for retaining said filter elements in a horizontally disposed position intermediate said inlet and outlet ports in a locked mode.

38. The invention according to claim 37 wherein said mounting means comprises a mast structure and a plurality of cross-bars, each cross-bar mounting an entire row of said matrix array.

39. The invention according to claim 38 further comprising a latching wrench for each said cross-bar which engages the respective said cross-bar in a locked position to latch an entire row of said matrix array in place.

40. The invention according to claim 39 comprising a superstructure mounted to said mast structure and preventing lateral displacement of said cross-bars relative to one another.

41. The invention according to claim 40 wherein the diameter of said access port is reduced relative to the diameter of said vessel body, and wherein said cross-bars, said latching wrenches and said superstructure are removable through said access port.

* * * * *